3,560,449
INTERNAL ANTISTATIC AGENT FOR POLYAMIDE USE AND POLYAMIDE COMPOSITIONS HAVING IMPROVED ANTISTATIC PROPERTY

Hiroshi Kitagawa, Nagoya, Ataru Suwada, Hirakata-shi, and Satoyoshi Ohno, Kyoto, Japan, assignors to Toray Industries, Inc., Tokyo, and Sanyo Chemical Industries, Ltd., Kyoto, Japan
No Drawing. Filed Apr. 25, 1968, Ser. No. 724,219
Int. Cl. C08g 20/00
U.S. Cl. 260—78      4 Claims

ABSTRACT OF THE DISCLOSURE

An internal antistatic agent for synthetic polyamide use which comprises a compound which is a phosphoric ester of an addition product of (i) is carbonamide group-containing compound and (ii) an alkylene oxide of 2 to 3 carbon atoms, said compound containing a structural unit of the formula

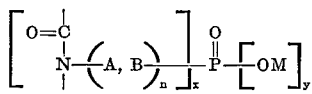

wherein A stands for ethyleneoxide, B stands for propyleneoxide,
$(A,B)_n$ stands for a homopolymer of ethyleneoxide or propyleneoxide or block or random copolymer of ethyleneoxide and propyleneoxide, $n$ is an integer from 10 to 1000, $x$ is 1 or 2, M is metals or hydrogen and $y$ is 1 or 2, with the proviso that the sum of $x$ and $y$ is equal 3, and when $x$ is 2, M is a metal and when $x$ is 1, at least one of the M's is a metal.

---

This invention relates to a new internal antistatic agent for synthetic polyamide use and also to the synthetic polyamide composition containing said antistatic agent.

In general, the synthetic fibers possess such characteristics as durability, tenacity and chemical inertness but, on the other hand, their insulation resistance being high, they have a tendency to becoming charged with static electricity. Hence, this becomes a serious matter during the production of textile materials or in wearing clothes made of such statically charged material.

As a method of preventing this electrification of the synthetic fibers, heretofore, it has been the general practice, for example, to effect the adhesion to the surface of the synthetic fibers of a surfactant which has an antistatic property, but the effect of most of these antistatic agents is only temporary and is lacking in durability. Further, a fabric which has been coated with an antistatic agent, which has been imparted durability by being insolubilized or fixed on the surface of the textile, generally has an unsatisfactory hand and hence becomes a fabric lacking in appeal. Accordingly, the idea that it might be possible to solve this problem by using the antistatic agent incorporated in the synthetic fiber is one which is readily conceivable by all. However, an internal antistatic agent which gives excellent antistatic property without any adverse effects on the spinnability and quality of the fiber upon being actually incorporated is not readily obtainable. There are one or two patent literatures which disclose antistatic agents directed to such a purpose, but there does not seem to be any which have actually been put to practice.

For example, a method, as disclosed in British Pat. 963,320 and U.S. Pat. 3,329,557, is known wherein a compound which has been obtained by effecting the bond of one end of polyethylene oxide with a hydrophobic group by means of an ether bond is mixed with a super polyamide, and this mixture is spun, but this method is not being actually used because of such drawbacks as that phase separation of this mixture occurs during spinning, or that the chips of the mixture are not satisfactorily caught into screw of the extruder.

Also known is a method of mixing the super polyamides with a phosphorus amide or metal salts other than alkali (e.g. Ca and Mg) with other nitrogen-containing compounds, but in this case the discoloration is frequently excessive and hence there is the drawback that the fibers obtained cannot be used for clothing purpose wherein white materials are required.

We found that when a salt of a phosphoric ester of a specific addition product, which comprises a specific compound having a carbonamide bond and an alkylene oxide, were incorporated in a super polyamide, the hereinbefore described troubles did not appear in the manufacture and processing of shaped articles of super polyamides and furthermore that an excellent antistatic effect was imparted to the polyamides without impairing the quality of the shaped articles.

It was also found that in the case of the polyamides containing the aforesaid antistatic agent not only was their antistatic property improved but also that the shaped aricles made therefrom were improved in such properties as light resistance, opacity, luster and soil resistance.

According to this invention, an internal antistatic agent for synthetic polyamide use is provided which comprises a compound which is a phosphoric ester of an addition product of (i) a carbonamide group-containing compound selected from the group consisting of lactums whose ring is formed by 3–12 carbon atoms, oligomers up to hexamers of said lactums, low molecular weight polycondensation products up to hexamers of ω-aminocarboxylic acids of 3–12 carbon atoms and low molecular weight polycondensation products of a molecular weight less than 3000 and up to hexamers of dicarboxylic acids and diamines and (ii) an alkylene oxide of 2 to 3 carbon atoms, said compound containing a structural unit of the formula

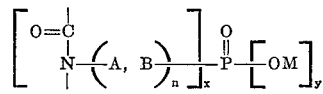

wherein A stands for ethyleneoxide, B stands for propyleneoxide, $(A,B)_n$ stands for a homopolymer of ethyleneoxide or propyleneoxide or a block or random copolymer of ethyleneoxide and propyleneoxide, $n$ is an integer from 10 to 1000, $x$ is an integer from 1 to 2, M is a member selected from the group consisting of metals and hydrogen and $y$ is an integer from 1 to 2, with the proviso that the sum of $x$ and $y$ is 3, and when $x$ is 2, M is metal and when $x$ is 1, at least one of the M's is a metal.

Further, the invention provides polyamide compositions whose antistatic property has been improved as a result of having been incorporated with 0.1 to 10 parts by weight of the aforesaid antistatic agent per 100 parts by weight of said super polyamide.

As the carbonamide group-containing compound to be used in the invention, included are lactams whose rings are formed by 3–12 carbon atoms, oligomers up to hexamers of said lactams, low molecular weight polycondensation products up to hexamers of ω-aminocarboxylic acids of 3–12 carbon atoms or low molecular weight polycondensation products of a molecular weight less than 3000 and up to hexamers of dicarboxylic acids and diamines, or the mixture of these. As the foregoing lactams, useable are the lactams of the formula

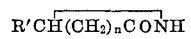

wherein R′ is hydrogen or alkyl radical and $n$ is a number from 1 to 10, particularly preferred being ε-caprolactam, capryllactam and laurolactam. Of the foregoing lactams, the oligomers of the polymerizable lactams, i.e. the oligomers of lactams whose degree of polymerization is from 2 to 6 can also be used in the invention. These oligomers may either be those of cyclic or chain configuration. Those having a degree of polymerization from 2-4 are particularly to be preferred in the invention. The oligomers of ε-caprolactam or the mixtures thereof are especially desirable from the standpoint of the utilization of by-products, since they are available as by-products in the process of producing 6 nylon.

As the low molecular weight polycondensation products of dicarboxylic acids and diamines, those of the following structural formula are used:

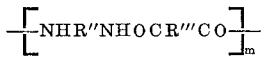

wherein R″ and R‴ are each a hydrocarbon residue of 2 to 25 carbon atoms and $m$ is a number from 1 to 6. Suitable diamines are exemplified by such as hexamethylenediamine and m-xylylenediamine, while examples of suitable dicarboxylic acids include such as adipic, sebacic, dodecandioic and isophthalic acids. As in the case with the oligomers of lactams, the low molecular weight polycondensation products of the ω-aminocarboxylic acids such, for example, as ω-aminoundecanoic, 7-aminoheptanoic acid and ω-aminocaproic acids can also be used.

The alkylene oxides include such, for example, as ethylene oxide, propylene oxide, and the mixture of ethylene oxide and propylene oxide.

As a method of adding the alkylene oxide to the aforesaid carbonamide group-containing compound, any method may be used. For instance, the alkylene oxide is addition polymerized to the carbonamide group-containing compound in customary manner in the presence of an acid or alkali catalyst at, say, a temperature of 140° C. and a pressure of 3 atmospheres. The foregoing methods do not limit this invention, however. Again, the alkylene oxide can be added in the singular, random or block form.

The number of moles of the alkylene oxide added may be chosen optionally in accordance with the objective desired but generally a better antistatic property is demonstrated in the case of the higher molar addition products. Hence, while there will be differences depending upon the class of the alkylene oxide, generally speaking, the use of 10 to 1000 molar equivalents, and especially suitably 20 to 500 molar equivalents, of the alkylene oxide, based on the carbonamide group of the aforesaid carbonamide group-containing compound is to be preferred.

The metal salt of phosphoric ester as used in this invention, can be prepared in the following manner. A phosphoric ester derivative is prepared by reacting in customary manner at, say, normal atmospheric pressure and a temperature of 70° C. either phosphoric anhydride or phosphorus (V) oxychloride with a polyalkylene oxide derivative obtained by the addition of alkylene oxide to the aforesaid carbonamide-containing compound. The so obtained phosphoric ester derivative is either directly neutralized to convert it to a metal salt or the metal salt is prepared by the double decomposition procedure by first forming an alkali metal salt and thereafter adding the desired metal salt. The foregoing procedures are however not to be construed as limiting this invention.

As the metal radical of the metal salt derivative of phosphoric ester, mention can be made of such, for example, as the alkali metals as Na and K, the alkaline earth metals as Mg, Ca and Ba, the transition metals as Cr, Co, Cu, Zn, Sn, Mn and Ni, and Al, of which convenient are the transition metals, particularly, Mn, Cu, Co and Ni.

Further, the metal salt derivative of phosphoric ester need not necessarily be one in which the remaining active hydrogen atoms of the phosphoric ester are all substituted by metal but may be one which is partially substituted. However, it is preferred that the hydrogen atoms not substituted are at a minimum when considered from the effects that are had on the spinning characteristics of the polyamide chips.

The invention antistatic agent thus obtained has in its molecules at least one structural unit of the formula

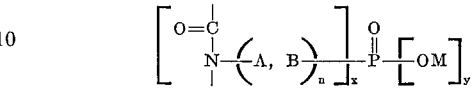

wherein the group $(A, B)_n$, $M$, $n$, $x$, $y$ and $x+y$ have the same meanings as hereinbefore defined, and the oxyalkylene block may be the same or different throughout the whole block. For example, the oxyalkylene block may be constituted of either polyoxyethylene, and oxyethylene/oxypropylene copolymer, or a polyoxyethylene/polyoxypropylene block copolymer. Further, the invention antistatic agent contains at least a single metallic atom in the foregoing structural unit, and when two are contained, the metallic atoms may be the same or different from each other.

The invention antistatic agent is incorporated in the synthetic linear super polyamide in an amount 0.1 to 10% by weight, and preferably 0.5 to 5% by weight, based on the polyamide. At this time, the content of the metal in the polyamide composition is preferably within the range of 10–1000 p.p.m. When the content of the metal is less than 10 p.p.m., an improvement effect in the resistance to light of the polyamide containing a polyalkylene ether compound cannot be expected. On the other hand, additions of the metal in amounts exceeding 1000 p.p.m. tend to invite trouble in carrying out the spinning such a polyamide.

As the synthetic linear super polyamides to which the invention antistatic agent is applicable, included are the usual super polyamides such as 6 nylon (poly-ω-caprolactam), 66 nylon (polyhexamethylene adipamide), 7 nylon (poly - ω - aminoheptanoic acid), 8 nylon (polycapryllactam), 9 nylon (poly-ω-aminononoic acid) 6, 10 nylon (polyhexamethylene sebacamide), 11 nylon (poly-ω-aminoundecaneamide) and 12 nylon (polylaurolactam); polyamides having an aromatic ring such as polyamide obtained from p-xylylenediamine and dodecandioic acid; and other polyamides having in their main chain an ether bond, or an alicyclic or hetero ring.

According to the invention, the aforesaid antistatic agent must be mixed homogeneously in these super polyamides. Thus, in this invention the antistatic agent is mixed in the polyamides before the latter are molded. For example, the super polyamide chips and the antistatic agent are first blended in an extruder, then the antistatic agent is dispersed uniformly by melting the mixture, and thereafter the mixture is extruded and made into filaments. Also useable is the master batch technique which is carried out in the following manner. A master batch is prepared which contains the antistatic agent in a high concentration. Next, this is mixed with polyamide chips to which the antistatic agent has not been added to accomplish the dilution of the mixture to the desired concentration thereby obtaining a mixture and hence products in which the antistatic agent is well dispersed. Alternatively, the polyamide chips can be treated with the antistatic agent dissolved in a solvent to effect the uniform blending of the antistatic agent with the polyamide chips, followed by removal of the solvent and spinning of the chips in customary manner. Again, the antistatic agent can be added to the monomer during the polymerization reaction, if necessary. Further, in the case of this method in which the antistatic agent is added during the polymerization reaction, a more uniform dispersion can be obtained than in the case where the antistatic agent is mixed with the chips. Moreover, it can be said to be more economical since an extra step is eliminated.

The polyamide compositions containing the invention antistatic agent can be readily formed into fiber, film, sheet, rod tube, casting and other articles by means which are generally known. An especially satisfactory antistatic effect can be manifested when the invention polyamide composition is formed into fibers.

The modified polyamide shaped articles incorporated with the invention antistatic agent, in the form of textiles, can be made into or used, for example, as staple, flock, filament, cord, tow woven fabric or the like. Further, they can either be used alone or as a blend with other fibers. Their bleaching and dyeing are also very easily carried out.

As a result of the incorporation of the invention antistatic agent in the polyamide, a marked decline in the insulation resistance of the shaped article takes place, and not only can a pronounced electrification be avoided semipermanently but also the extent to which the electrification phenomenon is affected by the humidity surrounding the shaped article is reduced. Hence, in the case of the so obtained filaments or staples, the troubles during their processing which are ascribable to static electricity can be eliminated. Moreover, the disagreeable phenomena such as dust adsorption and sparking which occur during wearing of clothes made from textile materials obtained by spininng and weaving these fibers can be prevented.

This antistatic effect does not decline with the passage of time. Furthermore, since the end of the alkylene oxide derivative has been phosphatically esterified and converted into a suitable metal salt, it is insolubilized against water, with the consequence that its resistance to washing is enhanced. Hence, the decline in the antistatic property is less even under harsh cleaning conditions, and its effect endures even after dyeing.

In addition, the invention antistatic agent possesses an excellent thermal stability. It withstands the elevated temperatures which are encountered during the manufacturing and processing steps of the polyamide shaped articles, and even when mixed with the polyamide it does not have an especially adverse effect on such textile product production steps of spinning of the filaments, drawing, spinning of staples, weaving and knitting. Moreover, there are observed no substantially adverse changes in the physical properties of the resulting yarn, for example, its tenacity, elongation, color weatherability and dye adhesion. Generally speaking, the resistance to light of the polyamide shaped articles, as such, is poor, and the presence of the simple alkylene oxide derivative which has not been esterified with phosphoric acid has a tendency in most cases to aggravate this property still further. However, in the case of the antistatic agent in accordance with this invention, the end of the alkylene oxide derivative having an active hydrogen has not only been esterified with phosphoric acid but also has been metallized by means of a metal such as Mn, Co, Ni and Cu. Hence, a significant improvement is had in the resistance to light, the improvement being such that it is not only better than the case when an alkylene oxide compound has been added but also better than the case of the polyamide shaped articles to which the addition of the alkylene oxide compound has not been made. Further, this property also demonstrates its effect in connection with the prevention of the degradation of the light fastness of disperse dyes which is seen when only the alkylene oxide compound has been added. When considered from the standpoint of this property, the metal salt which particularly excels is that of manganese.

Additional effects of an auxiliary nature which are brought about by the invention antistatic agent also include the outstanding improvements in such properties as the opacity, lustrousness and soil-proofness of the polyamide shaped articles containing the invention antistatic agent.

The fact that the invention antistatic agent comprising a salt of phosphoric ester of an addition product of a carbonamide group-containing low molecular weight compound and an alkylene oxide does not adversely affect the manufacturing operations of shaped articles even when incorporated in the polyamide, as hereinabove described, and furthermore imparts a durable antistatic property as well as light fastness to the polyamide while substantially maintaining its excellent physical properties is truly surprising. The incorporation of a metal salt of phosphoric acid, e.g. a manganese salt, in polyamides for improving its resistance to light is known. However, when a mixture of polyalkylene oxide and a phosphoric salt is mixed in polyamides with a view to improving the antistatic property and resistance to light of the polyamides, the filter pressure in the spinning machine rises abruptly to result in a marked decline in the machine's spinning capacity as well as an unsatisfactory state of the antistatic property and resistance to light of the fiber obtained. On the other hand, when the salt of phosphoric ester of polyalkylene oxide is used in the form of an addition product of the aforesaid carbonamide group-containing low molecular weight compound, all of the above-described drawbacks are solved and, in addition, an excellent antistatic property as well as resistance to light is developed.

The following examples are given for further illustration of the invention. Unless otherwise specified, the parts and percentages in the following examples are on a weight basis.

EXAMPLE 1

1320 parts of ethylene oxide were addition polymerized to 113 parts of epsilon-caprolactam in the presence of an alkali catalyst for a reaction time of about 4 hours at 150–180° C. and a reaction pressure of 4–5 kg./cm.$^2$ to obtain a light yellow, solid polyalkylene oxide derivative. 1433 parts of the so obtained polyalkylene oxide derivative and 48 parts of phosphoric anhydride were reacted for 4 hours at 60–70° C. and a light yellow, solid phosphoric acid ester was obtained. Next, this ester was neutralized with respectively caustic soda, calcium acetate and manganese acetic acid, after volatilizing the volatile portion, light to light yellow solid salts of phosphoric ester of the three classes of salts of Na, Ca and Mn salts were respectively obtained.

Next, 2 parts of each of the aforesaid salts of phosphoric ester were added respectively to 100 parts of polycaprolactam (inherent viscosity 2.56), mixed uniformly and thereafter pelleted to obtain pellets in which were incorporated the salts of phosphoric ester. These pellets were then in customary manner melt-spun at a temperature of 250–290° C. followed by drawing the freshly spun filaments about 4× to obtain a 1260 total denier, 60 filament yarn. In like manner, an unmodified control specimen not containing the salt of phosphoric ester was prepared.

Yarn A

Incorporated with a Na salt of phosphoric ester of ethylene oxide added ε-caprolactam.

Yarn B

Incorporated with a Ca salt of phosphoric ester of ethylene oxide added ε-caprolactam.

Yarn C

Incorporated with a Mn salt of phosphoric ester of ethylene oxide added ε-caprolactam.

Yarn D

Blank.

There was no substantial difference as to yarn breakage during drawing in the case of yarns A, B and C as compared with the case of yarn D and no decline in operational efficiency was noted.

The yarns were then subjected to harsh washing cycles and thereafter the effects thereof on the durability of the antistatic property and light fastness were evaluated. The measurement values obtained are shown in Tables I and II.

TABLE I

| Specimen | Resistance to washing of the antistatic property | | |
|---|---|---|---|
| | Number of washing cycles | Specific resistance (Ω cm.) | Frictional electrification voltage (V) |
| Yarn A | 0 | $2.10 \times 10^6$ | 13 |
| | 1 | $2.51 \times 10^6$ | 174 |
| | 5 | $7.18 \times 10^6$ | 129 |
| | 10 | $9.10 \times 10^6$ | 170 |
| | 20 | $8.99 \times 10^6$ | 220 |
| Yarn B | 0 | $6.54 \times 10^6$ | 18 |
| | 1 | $3.80 \times 10^6$ | 202 |
| | 5 | $1.18 \times 10^7$ | 280 |
| | 10 | $1.09 \times 10^7$ | 301 |
| | 20 | $1.20 \times 10^7$ | 340 |
| Yarn C | 0 | $3.63 \times 10^6$ | 17 |
| | 1 | $4.41 \times 10^6$ | 198 |
| | 5 | $7.90 \times 10^6$ | 194 |
| | 10 | $7.11 \times 10^6$ | 192 |
| | 20 | $7.33 \times 10^6$ | 223 |
| Yarn D | 0 | $1.13 \times 10^7$ | 49 |
| | 1 | $3.19 \times 10^8$ | 856 |
| | 5 | $3.08 \times 10^8$ | 950 |
| | 10 | $2.98 \times 10^8$ | 1,090 |
| | 20 | $2.16 \times 10^8$ | 1,082 |

Note: The specific resistance was measured at 90 volts.

In each of the cycles each of the specimens was washed for 30 minutes at the boil in a 0.5% aqueous solution of a commercial nonionic detergent followed by water-washing and drying. The temperature and humidity at which the measurements were made were 25° C. and 65% R.H. The frictional electrification voltage was obtained as follows: The specimen was mounted securely to a metallic rotary drum and a polyethylene terephthalate film was suspended with a 20-gram load. The voltage of electric charge generated in the specimen when the drum while rotating at 452 meters per minutes was rubbed against the film was measured. On the other hand, the specific resistance was measured in the following manner. The electric resistance of the specimen was measured by placing the specimen between a direct current electric source and a known resistance and measuring the partial voltage with dynamic condenser electrometer.

It is seen from the results given in Table I that yarns A, B and C demonstrate better antistatic effects than yarn D. In addition, it was noted that the resisance to washing of the former was superior to that of the latter.

Next, the results of the evaluation of the resistance to light of the specimens, when exposed to light from a fluorescent lamp are shown.

| Specimen | Exposure time (hr.) | Tenacity (g./d.) | Tenacity retention (percent) | Elongation (percent) | Elongation retention (percent) |
|---|---|---|---|---|---|
| Yarn A | 0 | 7,833 | | 28.7 | |
| | 100 | 6,867 | 87.8 | 23.3 | 81.2 |
| | 300 | 2,383 | 30.4 | 8.7 | 30.3 |
| Yarn B | 0 | 7,783 | | 30.0 | |
| | 100 | 6,600 | 84.8 | 21.7 | 72.3 |
| | 300 | 2,600 | 33.4 | 8.3 | 27.7 |
| Yarn C | 0 | 7,533 | | 36.7 | |
| | 100 | 7,133 | 94.7 | 30.7 | 83.7 |
| | 300 | 6,900 | 91.6 | 24.7 | 67.3 |
| Yarn D | 0 | 6,500 | | 45.0 | |
| | 100 | 3,333 | 97.4 | 28.7 | 63.8 |
| | 300 | 4,367 | 67.2 | 17.3 | 38.4 |

It was also formed that the yarns A, B and C were superior to yarn D with respect to opacity and surface luster.

EXAMPLE 2

The phosphoric ester of the addition product of ε-caprolactam and ethylene oxide of Example 1 was neutralized with zinc, copper and nickel acetates to prepare the corresponding Zn, Cu and Ni salts.

These salts of phosphoric ester were mixed with polyhexamethylene adipate (inherent viscosity 2.58) and the resulting mixtures were melt-spun and drawn as in Example 1. The so obtained yarns were measured for their specific resistance and frictional electrification voltage as in Example 1, with the following results.

TABLE III

| Additive | Number of times washed | Specific resistance (Ω cm.) | Fractional electrification voltage (V) |
|---|---|---|---|
| Ni salt | 0 | $1.2 \times 10^6$ | 21 |
| | 10 | $8.1 \times 10^6$ | 210 |
| Zn salt | 0 | $2.1 \times 10^6$ | 17 |
| | 10 | $7.6 \times 10^6$ | 180 |
| Cu salt | 0 | $1.8 \times 10^6$ | 25 |
| | 10 | $9.2 \times 10^6$ | 240 |

EXAMPLE 3

1100 parts of ethylene oxide were addition polymerized to 113 parts of ε-caprolactam in customary manner in the presence of an alkali catalyst at a reaction temperature of 150–180° C., a reaction pressure of 4–5 kg./cm.$^2$ and a reaction time of about 3 hours to obtain a light yellow, solid polyethylene oxide derivative.

993 parts of the so obtained polyethylene oxide derivative and 77 parts of phosphorus (V) oxychloride were then reacted for 5 hours at 40–50° C., after which the reaction product was neutralized with a caustic potash solution and the admixed inorganic matter was removed followed by volatilization of the volatile portion whereby was obtained a light yellow, solid K salt of phosphoric ester. In like manner, 1873 parts of a polyethylene oxide derivative obtained by addition of 1760 parts of ethylene oxide to 113 parts of ε-caprolactam were reacted with 77 parts of phosphorus (V) oxychloride and thereafter reacted with magnesium hydroxide to obtain a yellow tinged solid of a Mg salt of phosphoric ester.

Next, operating as in Example 1, 2.5 parts of each of the foregoing salts of phosphoric ester were added respectively to 100 parts of polyamide chips, after which the mixtures were blended uniformly and then pelleted. These pellets were then melt-spun into filaments at a temperature of 250–290° C. in customary manner, after which the freshly spun filaments were drawn about 4× and thereafter cut to prepare staple A (incorporated with the K salt of phosphoric ester) and staple B (incorporated with the Mg salt of phosphoric ester).

Both were of a denier number 3 and a cut length 51 mm. In like manner, staple C, the unmodified control specimen, was prepared. These staples were then scoured for 20 minutes at 60° C. in a scouring bath of a bath ratio 1:50 and containing 2% (OWF) of a nonionic surfactant and 1% (OWF) of soda ash, and thereafter dyed for 30 minutes at 98° C. in a dye bath of a bath ratio 1:50 and containing 3% (OWF) of an acid dye and 2% (OWF) of acetic acid.

This was followed by spinning the staples into yarn having a yarn count of 3/5 with a lower twist of 200 t./m. and an upper twist of 130 t./m., following which carpets A, B and C were made by tufting with the conditions of a pile density of 5/32 G, 8.5 S and ¼ inch cut followed by applying a latex backing and air drying.

The so obtained carpet specimens were each submitted to brushing using an aqueous solution of a commercial nonionic surfactant, then water-washed, dried for 6 hours at 60° C., and thereafter allowed to stand for 2 days at 30° C. and 35% R.H. The electrification voltage and the phenomenon of electrification as evident by a shock experienced by the human body were evaluated, with the results shown in Table IV. By way of reference a wool carpet was also compared at the same time.

The measurement was made in the following manner. A person wearing in one case cowhide soled shoes and in another case rubber slippers walks for a 10-minute period over a carpet laid in a humidity regulated room. Friction is thus caused to occur between the person and the carpet to result in the human body being charged with electricity. The voltage of this charge and the degree of shock that is felt when a metallic doorknob is touched were evaluated. The electrification voltage was measured with a current collecting type electrometer (a product of Kasuga Denki Co., Ltd., Japan).

each of which cycles the specimen were ironed at the usual temperature. The antistatic property and the frictional electrification voltage of the specimens before 4 cycles of washing and after the washing were evaluated, with the results shown in Table V.

TABLE IV.—ELECTRIFICATION AND SHOCK OF THE HUMAN BODY

| Specimen | When measured | Electrification voltage (V) | Degree of shock | Electrification voltage (V) | Degree of shock | Class of metal salt of the antistatic agent |
|---|---|---|---|---|---|---|
| Carpet A | Before washing | 600 | None | 1,000 | None | K salt of phosphoric ester. |
|  | After washing | 700 | do | 1,200 | do |  |
| Carpet B | Before washing | 400 | do | 1,100 | do | Mg salt of phosphoric ester. |
|  | After washing | 600 | do | 1,300 | do |  |
| Carpet C | Before washing |  |  |  |  |  |
|  | After washing | 6,000 | Great | 4,800 | Medium |  |
| Wool carpet | Before washing |  |  |  |  |  |
|  | After washing | 5,000 | Medium | 4,200 | Medium |  |

It can be seen from these results that the antistatic effect remained even after washing in the case of carpets A and B. In addition, it was noted that the electrification phenomenon and the degree of shock was less than in the case of the wool carpet and carpet C in which the antistatic agent was not incorporated. Further, when considered from the standpoint of their manufacture, there was observed no substantial difference between the carpets A, B and C.

EXAMPLE 4

440 parts of ethylene oxide were addition polymerized to 113 parts of ε-caprolactam in the presence of an alkali catalyst in customary manner at a reaction temperature of 160–180° C., a reaction pressure of 4–5 kg./cm.$^2$ and a reaction time of about 3 hours to obtain a light yellow, soft polyethylene oxide derivative. 553 parts of the so obtained polyethylene oxide derivative and 48 parts of phosphoric anhydride were then reacted for 5 hours at a reaction temperature of 60–70° C. to obtain a light yellow, viscous phosphoric ester. Next, this ester was neutralized with a caustic soda solution and, after removal of the volatile portion by volatilization, a light yellow Na salt of phosphoric ester (A) was obtained. In like manner, 1760 parts of ethylene oxide were addition polymerized to 113 parts of ε-caprolactam, then reacted with 48 parts of phosphoric anhydride and thereafter neutralized with caustic soda to obtain a Na salt of phosphoric ester (B).

Next, 10 parts each of the so obtained antistatic agents were mixed respectively with 100 parts of polycaprolactam chips (inherent viscosity 2.45), these preparing by the master batch procedure antistatic agent incorporated chips, which were then blended uniformly with unmodified chips not containing the antistatic agents such that the concentration of the antistatic agents would become 2% by weight. These blends were then spun at 250–290° C. in customary manner using a melt-spinning machine, after which the freshly spun filaments were drawn about 4× to obtain multifilaments (30 total denier, 10 filaments. The so obtained multifilaments were then knit into tricots A and B. In similar manner, tricot C, an unmodified control specimen, not containing the antistatic agents was prepared.

The so obtained three classes of specimen A, B and C were submitted to 4 times of harsh washing cycles, after

TABLE V

| Specimen | Before of after washing | Frictional electrification voltage (V) | Amount added of ethylene oxide of the antistatic agent and class of metal salt |
|---|---|---|---|
| Tricot A | Before | 100–150 | 440 parts of ethylene oxide added; Na salt of phosphoric ester. |
|  | After | 400–600 |  |
| Tricot B | Before | 80–120 | 1,760 parts of ethylene oxide added; Na salt of phosphoric ester. |
|  | After | 100–150 |  |
| Tricot C | Before | 500–800 |  |
|  | After | 2,300–2,500 |  |

Note: Measurement temperature and humidity 23° C., 47% R.H. The several specimens were submitted to the measurement after adjustment of their humidity at the same temperature and humidity for 48 hours.

As is apparent from the foregoing results, it is seen that the antistatic property of tricots A and B which had been incorporated with the invention antistatic agent remains even after the washing. Further, it is also seen that though a considerable antistatic effect is noted in the case of tricot A wherein the antistatic agent incorporated is one whose amount of ethylene oxide addition is less, it is somewhat inferior to that of tricot B wherein the amount of ethylene oxide addition is greater.

EXAMPLE 5

A tenfold amount of water was added to the residue remaining after recovering the lactam from the extraction water resulting during the manufacturing process of 6 nylon, followed by heating, filtering while hot and cooling of the filtrate. Water was again added to the so obtained precipitate followed by heating and cooling to obtain a precipitate. To 100 parts of the so obtained purified product of oligomer (degree of polymerization 2–3) and 50 parts of ε-caprolactam (ε-caprolactam is conjointly used to facilitate the addition of alkylene oxide) were block polymerized ethylene oxide and propylene oxide in customary manner in a weight ratio of 5:1 (reaction temperature 100–130° C., reaction pressure 2–3 kg./cm.$^2$, reaction time 13 hours) thereby preparing a light yellow, soft alkylene oxide derivative of a molecular weight of about 3500.

Next, after phosphatizing the so obtained alkylene oxide derivative as in Example 1, it was neutralized with a caustic soda solution to obtain, after volatilizing the volatile portion, a light yellow, viscous Na salt of phosphoric ester.

The so obtained antistatic agent was then mixed uniformly with 100 parts of polycaprolactam (inherent viscosity 2.45) in the amounts of repectively 0.5 and 3 parts, using a blender, following which the mixtures were pelleted with an extruder. These pellets were then melt-spun in customary manner at a temperature of 250–290° C. The resulting filaments were drawn respectively 4× to obtain multifilaments (75 total denier, 36 filaments), after which they were woven into plain weave taffetas A and B. In like manner, taffeta C, an unmodified control specimen, not containing the antistatic agent was prepared. These specimens were then washed for one hour at the boil in a 0.5% aqueous solution of an anionic detergent followed by water-washing and drying. The so obtained taffetas A, B and C were cut into pieces about 20 square centimeters and each was rubbed at given conditions with a polyester fabric and promptly brought into proximity of fresh tobacco ash and the degree of their attraction of the ash was observed and compared. The results obtained are shown in Table VI.

TABLE VI.—ANTISTATIC PROPERTY OF NYLON TAFFETA*

| Specimen | Degree of attraction of tobacco ash | Amount of antistatic agent added (part) |
| --- | --- | --- |
| Taffeta A | Attraction phenomenon noted at a height of 3–4 cm., but the ash easily drops away when the specimen is flicked lightly. | 0.5 |
| Taffeta B | Little, if any, attraction phenomenon is noted even at a height of 1 cm. | 3 |
| Taffeta C | Ash is attracted to a considerable degree at a height of 10–12 cm. and cannot be easily separated by light flicking. | 0 |

*Measurement temperature and humidity were 18° C. and 50% R.H.

EXAMPLE 6

1/350 mole of acetic acid and 2% by weight of the K and Mg salts of phosphoric ester of ethylene oxide added ε-caprolactam obtained in Example 3 were added respectively to 15% water-containing ε-caprolactam, following which the polymerization reaction was carried out in a polymerization kettle for 16 hours at 260° C. The so obtained chips were spun in customary manner at 250–290° C. and the resulting filaments were drawn about 4× to yield multifilaments (30 total denier, 10 filaments). After knitting these multifilaments into tubular knit fabrics, the fabrics were subjected to washing four times, and the respective fabrics were measured for their frictional electrification voltage, with the results shown in Table VII. By way of comparison, an unmodified control specimen was also prepared and tested at the same time.

TABLE VII

Antistatic property of tubular knit specimens after washing *

| Specimen | Frictional electrification voltage (V) | Antistatic agent |
| --- | --- | --- |
| Tubular knit fabric A | 80–120 | K salt of phosphoric ester. |
| Tubular knit fabric B | 70–100 | Mg salt of phosphoric ester. |
| Tubular knit fabric C | 2,000–2,500 | |

* Measurement temperature and humidity were 18° C. and 60% R.H.

It was seen that specimen A and B demonstrated a satisfactory antistatic effect.

EXAMPLE 7

Yarns A, B, C and D prepared in exactly the same manner as in Example 1 were, after scouring, dyed for 30 minutes at 98° C. using a dye bath containing 3% OWF of an acid dye Supranol Red 3BL and 2% OWF of acetic acid, with a bath ratio, 1:50 followed by a tannin treatment. The antistatic property of the yarn was evaluated as in Example 1, with the results shown in Table VIII.

TABLE VIII.—ANTISTATIC PROPERTY AFTER DYEING

| | Specific resistance (Ω cm.) | | |
| --- | --- | --- | --- |
| | Before dyeing (after scouring) | After dyeing | After dyeing and tannin treatment |
| Specimen: | | | |
| Yarn A | $4.98 \times 10^6$ | $7.97 \times 10^6$ | $4.24 \times 10^7$ |
| Yarn B | $9.23 \times 10^6$ | $9.07 \times 10^6$ | $1.35 \times 10^8$ |
| Yarn C | $9.54 \times 10^6$ | $5.62 \times 10^6$ | $6.25 \times 10^7$ |
| Yarn D | $1.47 \times 10^9$ | $8.09 \times 10^8$ | $3.67 \times 10^9$ |

In the case of yarns A, B and C, it was seen that an excellent antistatic effect was maintained even after the dyeing and tannin treatment.

Further, when these specimens were evaluated as to their dyeings, resistance to light and fastness to washing when dyed with dyestuffs other than the foregoing acid dye, i.e., disperse dyes and the 1:2 type complex dyes, in all instances it was found that there were no problems.

EXAMPLE 8

The Mn salt of phosphoric ester of the ethylene oxide added ε-caprolactam synthesized in Example 1 was added to poly-ε-caprolactam chips (inherent viscosity 2.56) in a proportion of 3% and mixed therewith, following which the so obtained mixture was melt-spun and the resulting filaments were drawn as in Example 1 to obtain yarn A.

On the other hand, an equimolar quantity of manganese phosphate and polyethylene glycol of an average molecular weight of 1000 were mixed and using this mixture in an amount of 3% by weight mixed spinning was carried out as hereinabove described to obtain yarn B. The differences in the antistatic property and spinnability between these two yarns are shown in the following table.

TABLE IX

| Specimen | Antistatic property (after washing) (V) | Spinnability |
| --- | --- | --- |
| Yarn A | 220 | No particular problem. |
| Yarn B | 900 | Rise of the filter pressure in the spinning machine was great and the accomplishment of spinning was difficult. |

Thus, when a mixture of manganese phosphate and polyethylene glycol is merely added, not only the spinning of the filaments is rendered difficult but also the antistatic property of the resulting filaments is inadequate. On the other hand, the foregoing troubles can be done away with and the antistatic property can be enhanced by this invention which uses the ester of manganese phosphate and polyethylene glycol as an addition product of ε-caprolactam.

EXAMPLE 9

(1) One percent by weight of metallic potassium was added at about 80° C. to distilled α-pyrrolidone in a stream of dry $N_2$, following which the polymerization reaction was carried out for 12 hours. The so obtained polymeric mass was comminuted (polymer A).

(2) ω-Aminoundecanoic acid was polymerized for 10 hours at 220° C. in a stream of $N_2$. After cooling in a $N_2$ stream, the polymer was taken out (polymer B).

(3) A 6,6 salt was prepared in customary manner from hexamethylenediamine and adipic acid. This was heated for 1.5–2 hours at 215° C. in a polymerization tube. After cooling to room temperature and purging several times with $N_2$, it was heated at 270° C. An hour later, it was heated for another hour under reduced pressure of 0.2–1.5 mm. Hg. After cooling, a white opaque polymer was separated (polymer C).

The so obtained polymers A, B and C were each added to a tenfold amount of water and were heated and filtered followed by cooling the filtrates to obtain precipitates. Water was again added to the so obtained precipitates which were heated and cooled to again obtain precipitates.

To 100 parts of purified products of the several oligomers (degree of polymerization 2–3) so obtained were respectively addition polymerized 1000 parts of ethylene oxide in customary manner as in Example 1 thereby obtaining three classes of solid reaction products. By operating as in Example 1, the Mn salts of phosphoric ester of each of these reaction products were prepared. Blends of each of these reaction products were prepared as in Example 1 by adding 2.5 parts thereof to 100 parts of poly-ε-caprolactam chips (inherent viscosity 2.56), after which these blends were spun in customary manner and then the freshly spun filaments were drawn about 3.5× to yield multifilaments (30 total denier, 10 filaments). After tubular knit fabrics were knit from these multifilaments, the fabrics were washed four times with a 0.2% detergent solution. The antistatic property of the fabrics was then measured, with the results shown in Table X.

TABLE X

| Specimen: | Electrification voltage (v.) |
|---|---|
| Oligomer derivative of polymer A | 140 |
| Oligomer derivative of polymer B | 170 |
| Oligomer derivative of polymer C | 190 |

We claim:

1. A fiber forming synthetic linear saturated aliphatic polycarbonamide composition having antistatic property, said composition consisting essentially of 0.1 to 10 percent by weight, based on said polycarbonamide, a homogeneously distributed compound which is a phosphoric ester of an addition product of (i) a carbonamide group-containing compound selected from the group consisting of lactams whose ring is 3–12 carbon atoms, oligomers up to hexamers of said lactams, low molecular weight polycondensation products up to hexamers of ω-aminocarboxylic acids of 3–12 carbon atoms and (ii) an alkylene oxide of 2 to 3 carbon atoms, said compound containing a structural unit of the formula

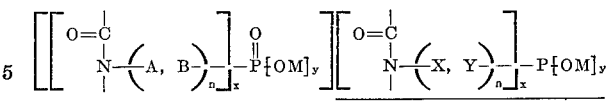

wherein X stands for ethyleneoxide, Y stands for propyleneoxide, $[(A, B)_n]$ $(X, Y)_n$ stands for a homopolymer of ethyleneoxide or propyleneoxide or a block or random copolymer of ethyleneoxide and propyleneoxide, $n$ is an integer from 10 to 1000, $x$ is an integer from 1 to 2, M is a member selected from the group consisting metals and hydrogen and $y$ is an integer from 1 to 2, with the proviso that the sum of $x$ and $y$ is 3, and when $x$ is 2, M is a metal and when $x$ is 1, at least one of the M's is a metal, said metal being selected from the group consisting of alkali metals, alkalene earth metals and transition metals.

2. A fiber of the composition of claim 1.

3. A synthetic polyamide composition according to claim 1 wherein the alkali metals are selected from the group consisting of Na and K, the alkalene earth metals are selected from the group consisting of Mg, Ca and Ba and the transition metals are selected from the group consisting of Cr, Co, Cu, Zn, Sn, Mn, Ni and Al.

4. A synthetic linear polyamide composition according to claim 3 wherein the transition metals are selected from the group consisting of Mn, Cu, Co and Ni.

References Cited

UNITED STATES PATENTS

| 2,835,653 | 5/1958 | Haas et al. | 260—78 |
| 2,998,295 | 8/1961 | Goldann | 260—78 |
| 3,038,885 | 6/1962 | Best | 260—78 |

HAROLD D. ANDERSON, Primary Examiner

U.S. Cl. X.R.

161—168

UNITED STATES PATENT OFFICE
CERTIFICATE OF CORRECTION

Patent No. 3,560,449　　　　　　　Dated February 2, 1971

Inventor(s) Hiroshi Kitagawa, Ataru Suwada and Satoyoshi O

It is certified that error appears in the above-identified patent and that said Letters Patent are hereby corrected as shown below:

Claim 1, line 14, delete all formulae and insert therefor:

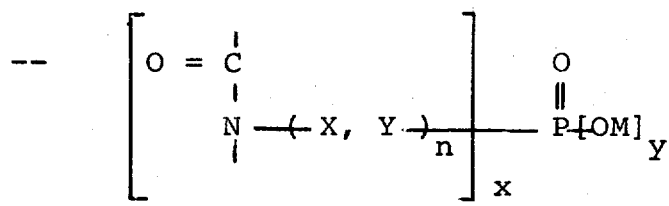

line 16, delete "[(A, B)$_n$]"

Signed and sealed this 15th day of February 1972.

(SEAL)
Attest:

EDWARD M. FLETCHER, JR.　　　　ROBERT GOTTSCHALK
Attesting Officer　　　　　　　　Commissioner of Patents